United States Patent [19]

Fukuda

[11] 4,019,345
[45] Apr. 26, 1977

[54] FLEXIBLE COUPLING FOR ROTATING SHAFTS

[75] Inventor: Kazuichi Fukuda, Fujisawa, Japan

[73] Assignee: Kanto Special Steel Works, Ltd., Fujisawa, Japan

[22] Filed: Dec. 15, 1975

[21] Appl. No.: 641,035

[30] Foreign Application Priority Data

May 12, 1975 Japan .............................. 50-56596
Oct. 8, 1975 Japan ...................... 50-137615[U]
Oct. 8, 1975 Japan ...................... 50-137616[U]

[52] U.S. Cl. ..................................... 64/12; 64/13; 64/19
[51] Int. Cl. ............................................. F16d 3/58
[58] Field of Search ..................... 64/19, 12, 13, 31

[56] References Cited
UNITED STATES PATENTS

| | | | |
|---|---|---|---|
| 2,181,888 | 12/1939 | Gusfin | 64/12 |
| 2,580,781 | 1/1952 | Hoffer | 64/19 |
| 2,864,245 | 12/1958 | Amberg | 64/12 |
| 3,494,147 | 2/1970 | Goody | 64/12 |

*Primary Examiner*—Samuel Scott
*Assistant Examiner*—Randall Heald
*Attorney, Agent, or Firm*—Wenderoth, Lind & Ponack

[57] ABSTRACT

A flexible coupling has a pair of hub members each having a flange and being connected, respectively, with a drive shaft and a driven shaft, and a main set mounted for free removal between the flanges of the respective hub members facing each other, said main set having a pair of disks and a plurality of connecting members, each connecting member being composed of connecting elements in the form of layers each made of resilient thin sheet material, the disks each having a plurality of pins fixed perpendicularly on the surface of the disk in an arrangement in which each two adjacent pins have an equal distance between them along the circumferential direction of the disks, the disks facing each other with the pins on each disk projecting toward the opposite disk so that the pins of the respective disks facing each other are arranged alternately side by side with an equal distance between any two adjacent pins, the connecting members being connected between adjacent pins to form polygonal links between the disks in the circumferential direction. Torque is transmitted from the drive shaft to the driven shaft through the connecting members so as to produce a tensile force thereon.

9 Claims, 16 Drawing Figures

FLEXIBLE COUPLING FOR ROTATING SHAFTS

BACKGROUND OF THE INVENTION

The present invention relates, in general, to a flexible coupling for rotating shafts and more particularly to a flexible coupling for rotating shafts to transmit a comparatively great amount of torque between rotating shafts even though the shafts may be slightly misaligned.

Mutual misalignment of the shafts can be axial misalignment, angular misalignment and displacement between the drive shaft and the driven shaft, that is, there are three kinds of such misalignment.

As couplings for rotating shafts operating in mutual misalignment, there have been used flexible couplings using rubber or metal springs as elastic bodies, and gear couplings and the like utilizing the sliding action of gears. However, the former couplings, that is, flexible couplings using rubber or the like as elastic bodies, can transmit only a comparatively small amount of torque for their size, making themselves unsuited as couplings for transmitting a great amount of torque. On the other hand, the latter couplings, that is, gear couplings tend to have the tooth faces subjected to wear or spalling to a serious degree after a comparatively short period of use, making it necessary to replace them, which is a great disadvantage. But the gear couplings can transmit a great amount of torque for their size, and therefore, they are used widely as flexible couplings for rolling mills in steel plants or the like.

As mentioned above, the gear couplings are subject to reduced performance due to unavoidable wear, particularly when they are rotated at high speed, but there are no substitutes therefore and hence the above mentioned gear couplings must be used at the present time.

In order to solve the above-described problem, the inventor of the present invention has developed (U.S. Patent application Ser. No. 549,036 filed Feb. 11, 1975) a flexible coupling having a new structure for transmitting a great amount of torque (say 3,000 kg-m) for use in driving rolls of rolling mills. Said flexible coupling can transmit a great amount of torque for its size, without reduced performance due to wear such as occurs with the gear couplings, which is a great advantage.

On the other hand, for rollers of the roller table of a rolling mill there have been used flexible coupling for transmitting somewhat smaller amount of torque than the above-described flexible coupling for transmitting a great amount of torque; and for machine tools, pumps, compressors and other driving systems, there have been used flexible couplings for transmitting a comparatively low torque. Also in these fields of application, gear couplings have also been used as flexible couplings, resulting in the above-described trouble. Sometimes there are used disk couplings, which, however, are inferior in strength and are required to be machined with higher accuracy. For the inspection and maintenance of the rotating shaft system, the drive shaft and the driven shaft of the coupling may sometimes be separated for repairing or replacement of the coupling. Therefore, the down-time for repairing or replacement is required to be as short as possible for flexible couplings, in order to carry out speedy inspection and maintanence.

SUMMARY OF THE INVENTION

It is the object of the present invention to provide a flexible coupling for rotating shafts, which can transmit greater amount of torque and which has a longer life than a coupling of the conventional type, for the same compactness and size.

Another object of the present invention is to provide a flexible coupling for rotating shafts, which can correct mutual misalignment between the drive shaft and the driven shaft without causing bad influences, by utilizing elastic deformation produced, transversely to the longitudinal direction of the shafts by members of high tensile strength connected between the drive shaft and the driven shaft.

A further object of the present invention is to provide a flexible coupling for rotating shafts, which can be manufactured by using ordinary machine tools, that is without using such special machine tools as hobbing machines.

A further object of the present invention is to provide a flexible coupling for rotating shafts, which permits the drive shaft and the driven shaft to separate easily and can be easily mounted on and removed from these shafts.

A further object of the present invention is to provide a flexible coupling for rotating shafts having the members connected elastically between the drive shaft and the driven shaft for free mounting and removal.

A further object of the present invention is to provide a universal coupling having a plurality of main sets, which can correct a great degree of mutual misalignment.

In order to achieve the abovementioned objects, the flexible coupling for rotating shafts according to the present invention comprises a pair of hub members each having a flange and being connected, respectively, with the drive shaft and the driven shaft, and a main set freely removably mounted between the flanges of the respective hub members facing each other, said main set having a pair of disks and a plurality of connecting members, each connecting member being composed of connecting elements in the form of layers each made of resilient thin sheet material, said disks each having a plurality of pins fixed perpendicularly on the surface of the disk with each two adjacent pins being at an equal distance in the circumferential direction of the disks, the disks facing each other with the pins on each disk projecting toward the opposite disk so that the pins of the respective disks facing each other are arranged alternately side by side with an equal distance between any two adjacent pins, the connecting members being connected between adjacent pins to form polygonal links between the disks in the circumferential direction.

DESCRIPTION OF THE PREFERRED EMBODIMENTS

Figure 1:
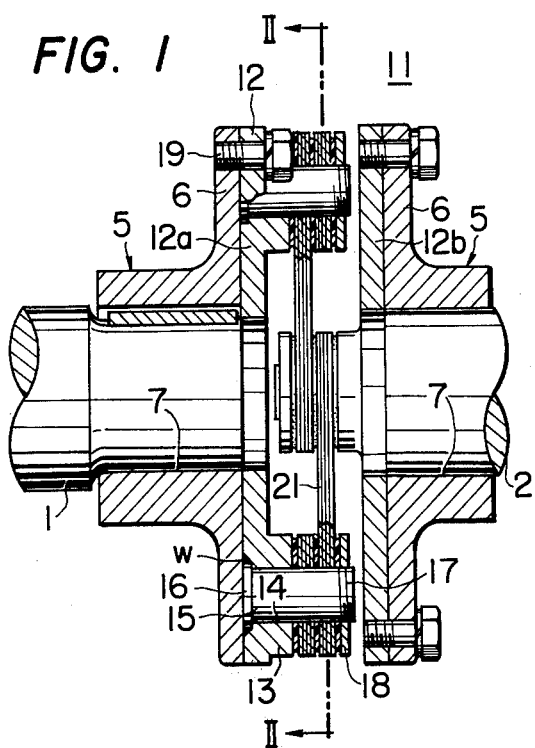
FIG. 1 is a longitudinal sectional view of a flexible coupling showing one embodiment of the present invention.

Referring to FIGS. 1 to 6, the flexible coupling as shown therein consists mainly of a pair of hub members 5 and a pair of main sets 11.

Each of the hub members 5 has a flange 6 at one of its ends, and shaft openings 7 receiving respectively a drive shaft 1 and a driven shaft 2 therein.

The main sets 11 each have an annular disk 12. On the surface of each of the disks 12 there are provided two projections 13 at positions 180° from each other in the circumferential direction of the disk, and projection has a pin 15 therethrough parallel with the rotational axis of the disk. Each pin 15 has an enlarged bottom end and each pin 15 is inserted into a pin hole 14 which is bored exactly perpendicularly to the surface of the disk, and is connected with the disk by welding w around the enlarged bottom end. Because the projections 13 are provided on the surface of the one disk 12, there can be produced a space wide enough for the prevention of the tip of a pin 15 or the opposite disk from hitting the surface of the one disk, when the two disks 12 face each other.

Figure 2:
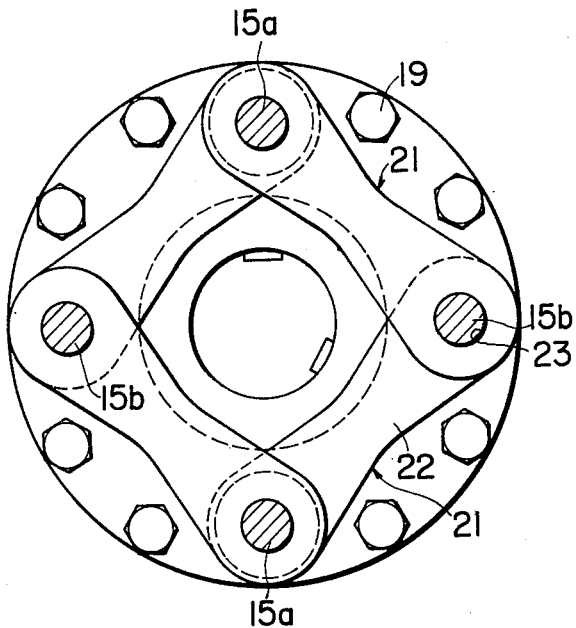
FIG. 2 is a cross-sectional view of the flexible coupling of FIG. 1 on line II — II thereof.
Figure 3:
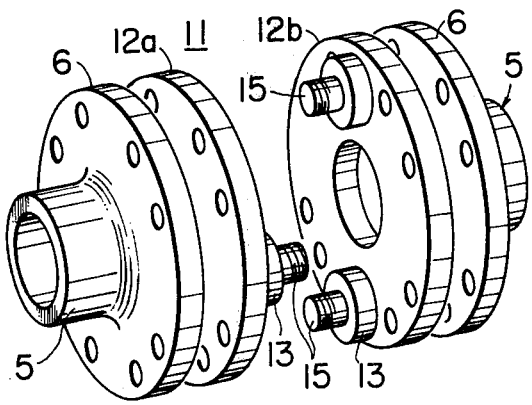
FIG. 3 is an exploded perspective view of the main portion of the flexible coupling of FIG. 1.

As shown in FIG. 3, a pair of the thus constructed disks 12a and 12b have the pins 15 thereon projecting toward the respectively opposite disks, the pins 15 on the opposite disks being positioned so that there is an equal distance between any two adjacent pins, the distance covering an angle If 90° in the circumferential direction. And, as shown in FIG. 2, each pair of adjacent pins 15, say, 15a and 15b, is connected by a connecting member 21 with that adjacent connecting members 21 having their end portions overlapped and a pin 15 extends through said overlapped ends for connection of the adjacent connecting members and disks so that the pair of disks 12a and 12b are connected by four connecting members positioned one after another in the circumferential direction of the disks and acting as links between. Each connecting member 21 consists of a great number of, say 20, pieces of steel sheet as thin as, say, 1.5 mm and having an ovaloidal shape; and each piece has a through hole 23 provided at both ends, through which a pin 15 is inserted. Each pin 15 has the tip threaded at 17 to receive a nut 18 for holding the overlapped connecting pieces on the pin.

The thus constructed main set 11 is inserted between the hub members 5 which are so arranged as to have their respective flanges 6 face each other and the disks 12 of the main set 11 are connected with the flanges 6 by bolts 19 so that they can be easily removed from the flanges.

The following is an explanation of the operation of the flexible coupling which is contructed as described above.

The function of the connecting members is to transmit torque which accommodating mutual misalignment between the drive shaft 1 and the driven shaft 2. One of the sets of connecting members 21 receives torque in the form of tensile load in the longitudinal direction of the connecting members 21, so as to transmit such tensile load as torque from the pins 15a on the disk 12a to the pins 15b on the disk 12b. In this case, the connecting members 21 deflect in a direction perpendicular to the surface thereof facing the disks 12a and 12b, thereby accomodating mutual misalignment between the two shafts. The other set of connecting members 21 is involved in the transmission of torque when the driving system operates at reduced speed or reversely. As the connecting members 21 are each composed of a great number of thin steel sheet pieces in layers, they can easily deflect, and can transmit a great amount of tensile force produced by torque. In further regard to the flexible coupling using four sets of connecting members 21 for the connection of disks 12, as in the case of this embodiment of the present invention, the tolerance in the accuracy of the size of the through hole 14 is several times as great as the tolerance in the size of such through holes as those provided on a disk coupling having four holes in one coupling.

Figure 6:
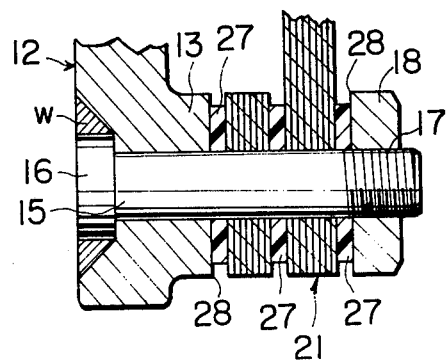
FIG. 6 is an enlarged cross-sectional view of a portion of the flexible coupling shown in FIG. 1.

As for the separation of the drive shaft 1 and the driven shaft 2, as shown in FIG. 1, the bolts 19 can be removed and the main set 11 can be taken out in the direction perpendicular to the shafts between the hub members 5 facing each other. Nothing more than the replacement of the main set need be done, even in case connecting members or pins are broken, requiring the replacement of the coupling. As described above, the pin 15 is connected with the disk 12 by weld w, thus being integrated into one body with the disk; therefore, there can be no displacement of the positional relation between the pin and the disk, causing no such undesirable bending or torsional stress in the connecting members 21 which may be produced by the displacement of such relation, and accordingly uniform force distribution over the connection members 21 is maintained. As for the pin 15 itself, no fretting corrosion is produced at all thereon, so that it does not separate from the disk. Also, as shown in FIG. 1 or FIG. 6, the end portion 16 of the pin 15 may be made somewhat larger in diameter, so as to enhance the strength of the weld w and reduce the thickness of the disk 12, including the projection 13, thereby greatly shortening the overall length of the flexible coupling. Furthermore, pins 15 may be heat-treated; for example, they may be quenched in such a manner that only the surface portion is hardened, so as to improve fatigue strength and wear resistance.

As for the connecting element 22, it receives tensile force, bending force and torsional force repeatedly working thereon, but the fatigue limit depends greatly on its shape; more particularly, a greater number of cases of breakage of connecting members is caused by tensile fatigue produced in the connecting element. Also, as the shape of the connecting element is a factor is designing the size of the coupling, it should desirably be such that it is the smallest in size, while it has the greatest strength. In order to meet such a requirement, the shape of the connecting element according to the present invention has been made ovaloidal as described above, in the light of the results of laboratory so that the connecting element 22 has two semi-circular portions at the longitudinal ends each portion having a through hole 23 concentric therewith, these two portions being connected with arcs curved gently inwardly so as to form a narrowed central portion. Normally steel is the material of the connecting element 22, but plastics reinforced with inorganic fibers such as glass fiber or carbon fiber can be used for comparatively smaller loads.

The connecting element 22 made of steel can become corroded, and is subjected to stress corrosion due to the tensile force working thereon during operation. Also, there is a slip, although it is very slight, between connecting elements laid one on another, in the case of heavy bending thereof, and therefore there may be local heat generation in case the misalignment between shafts becomes abnormally great. In this case, there may occur a reduction of strength and fatigue limit of the connecting members as a result of retempering and recrystallization.

Figure 4:
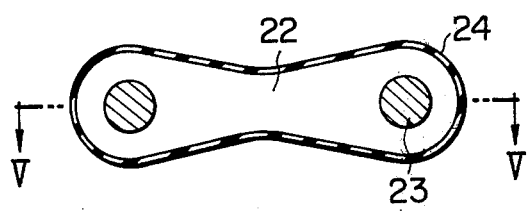
FIG. 4 is a transverse sectional view of a connecting member used for the flexible coupling of the present invention.
Figure 5:
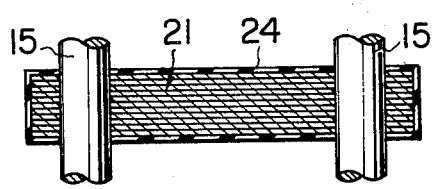
FIG. 5 is a cross-sectional view of the connecting member of FIG. 4 on line V — V thereof.

The connecting member shown in FIGS. 4 and 5, provides a solution to the abovementioned problem. Said connecting member 21 is composed of a plurality of connecting elements laid one on another, and the outside surface is covered except at the through holes 23; and as for the material of such cover 24, there is used in most cases an a elastomer such as neoprene, urethane rubber or other kinds of synthetic rubbers. Such material is highly flexible, and can be deflected easily, and therefore, even though such cover 24 surrounds and holds the connecting elements 22 tightly, the assembly does not become a perfectly solid structure. In addition, such elastomers generally have good oil resistance, so that there is no danger of swelling even when they contact mineral oil.

The covering method is so carried out by placing a required number of connecting elements 22, all having the same prescribed shape, in a mold, and after such areas as the through holes 23 that should not be covered, are protected a covering material is flowed into the mold, and heated for polymerization and hardening. Lubrication is by means of a liquid lubricant, a pasty lubricant such as grease or a powdered lubricant such as molybdenum disulphide which is applied between any two contacting connecting elements 22. The powder lubricant, can be pressed into the assembly through the through hole 23 which is not covered. Thus, covering and lubrication should be made by any method which is appropriate for the materials used.

When connecting members 21 are mounted on the pins 15 during the assembly of a main set 11, the lubricant will be completely confined within the cover 24, so that there is no danger of leakage, no need of feeding further lubricant and no influences from outside such as rust production or corrosion.

Referring to FIG. 6 showing the embodiment of the present invention, there are present according to the present invention, washers 27 made of a soft elastomer such as rubber or plastic between the projections 13 of disks 12 and connecting members 21, between nuts 18 and connecting members 21 and between connecting the members 21 themselves. These washers 27 prevent connecting members 21 from breaking at the point where the side surface of the connecting member 21 hits the projection 13 and the edge 28 of the outer circumference of nuts 18.

If the connecting members 21 twist so that they are at an angle to the pins 15 in the axial direction of the pins, the washers 27 compress or expand in the direction of their thickness, absorbing the shift of the connecting elements 22 relative to the axis of the pins 15 and preventing an abnormal force from acting on the connecting elements 22.

Figure 7:
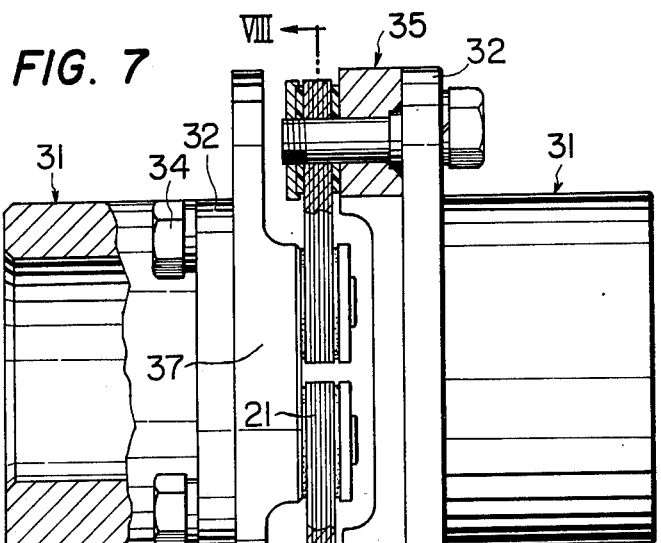
FIG. 7 is a longitudinal view, partly in section, of a flexible coupling showing another embodiment of the present invention.
Figure 8:
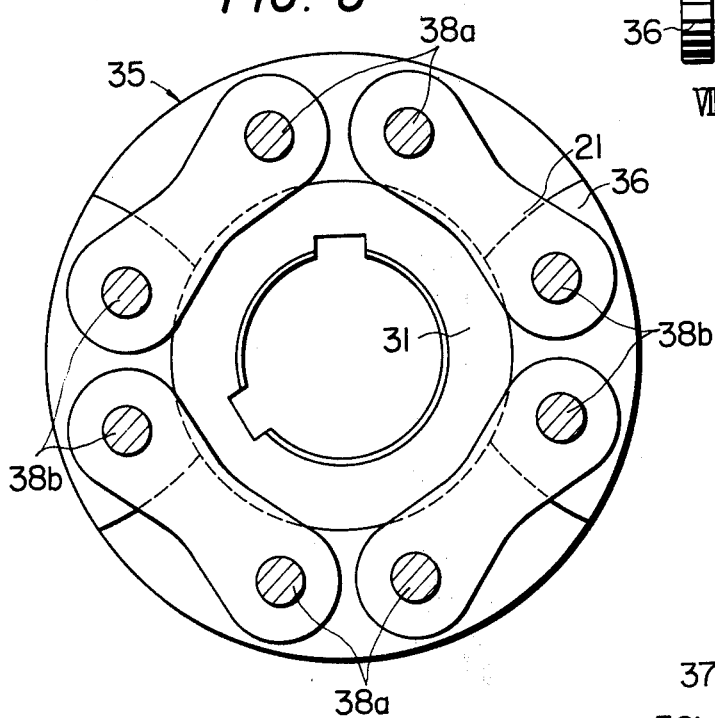
FIG. 8 is a cross-sectional view of the flexible coupling of FIG. 7 on line VIII — VIII thereof.
Figure 9:
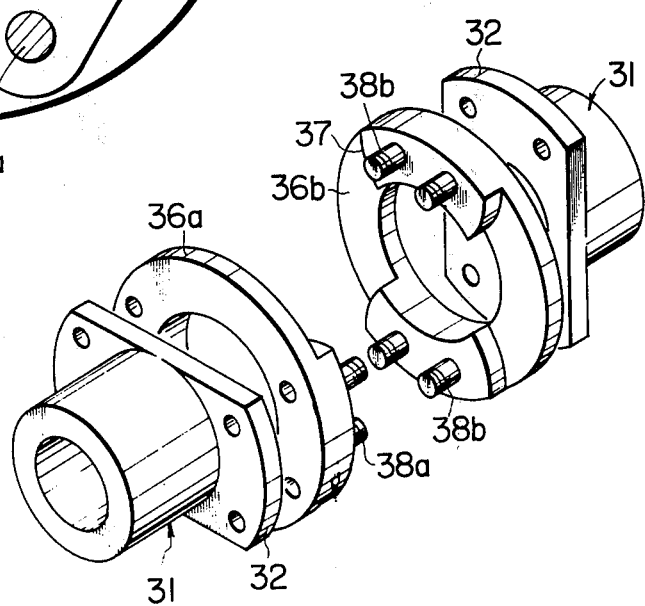
FIG. 9 is an exploded perspective view of the main portion of the flexible coupling shown in FIG. 7.

The following is a description of another embodiment of the present invention as shown in FIGS. 7 to 9.

As in the case of the above-described embodiment (hereinafter called the first embodiment), the main set 35 according to this embodiment (hereinafter called the second embodiment) has a pair of disks 36. There are provided on the surface of each disk 36 a pair of projection 37 spaced from each other at an angle of 180° in the circumferential direction of the disk, each projection having a circumferential dimension sufficient to have mounted thereon a pair of pins 38 positioned close to each other in the circumferential direction. Each of the pins 38 is connected with the projection 37 by weld w. While one disk 12 has two pins 15 fixed thereon in the case of the first embodiment, one disk 36 according to the second embodiment has four pins 38 fixed thereon.

The pair of the thus constructed disks 36a and 36b according to the second embodiment are positioned opposite each other in such manner that the projections 37 on opposite disks are spaced at an angle of 90° in the circumferential direction so that the pins 38 on the opposed disks are similarly spaced. As shown in FIG. 8 the connection between the two disks 36a and 36b is by connecting a pin 38a on one disk with an adjacent pin 38b on the other disk by a connecting member 21, with four connecting members 21 being connected in this way. The connecting members 21 according to this embodiment have the same construction as in the case of the first embodiment; therefore, the connecting members 21 which are covered as shown in FIG. 4, can also be used in this embodiment.

The thus constructed main set 35 is removably mounted on the hub members 31 by connecting the disks 36 by bolts 34 with the flanges 32 of the respective hub members 31.

The flexible coupling according to this embodiment works in the same manner as in the case of the first embodiment. But the difference between the two flexible couplings in the method of mounting the connecting members to connect the disks, gives to the flexible coupling according to this embodiment the following advantages over that of the first embodiment: Because connecting members can be provided near the outer circumference of the disks, the pitch diameter of the pins can be made larger, therefore ;making it possible to transmit a greater torque. It is also possible to make the outer diameter of the hub member larger, which hub member is to be inserted into the space within the connecting members which are arranged as links in a polygonal pattern in the circumferential direction of the disks when two disks are connected thereby, therefore making it possible to make the diameter of the rotating shafts greater. The pitch diameter of the pins is not so severely restricted by the length of the connecting member. Because no connecting member overlaps any other connecting member which it adjoins at the pin portion, but rather is on the same level therewith, the crossing point of the axes of the drive shaft and the driven shaft misaligning each other, that is the center of misalignment of the shafts, always remains at the center of the thickness of the connecting member; therefore, even such misalignment does not cause an abnormal force to act on the connecting members, making the strength of the pins greater with respect to the transmitted torque. Also, because only one pin is connected with a connecting member, the distance between the opposite face surfaces of the flexible coupling can be made smaller. In the case of using two flexible couplings as components of a universal coupling (which will be described in a third embodiment), the distance between the centers of said two misaligned flexible couplings be increased by an amount corresponding to the reduction of the distance between the surfaces of said respective flexible couplings, making it possible to increase the allowable angle of misalignment for the same distance between the opposed surfaces of the universal coupling; thus, the connecting member can be made smaller for the same amount of the transmitted torque, resulting in the reduction of the total cost of the flexible coupling and also in a decrease of deflection which makes smaller the allowable angle of misalignment of the shafts.

Figure 10:
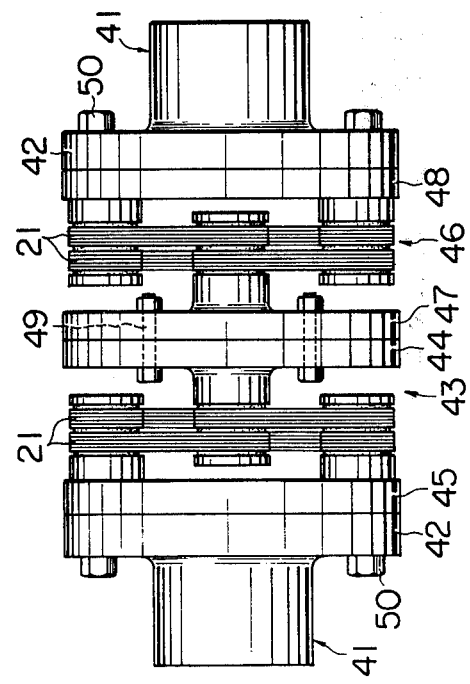
FIG. 10 is an elevation view of one embodiment of a universal coupling using two coupling bodies constituting the flexible coupling of the present invention.

The following is a description of a universal coupling composed of a plurality of sets of such flexible couplings as described above, which is for accomodating misalignment of the shafts:

FIG. 10 shows a universal coupling composed of two main sets as described in the first embodiment arranged in series. In this drawing, the disk 44 of the main set 43 is connected back-to-back with the disk 47 of the main set 46, by bolts 49; and outside disks 45 and 48 are connected with the flanges 42 of the respective hub members 41 by bolts 50.

The flexible coupling which uses two main sets 43 and 46 arranged in series in this manner, can accomodate a greater misalignment of the shafts than the coupling which uses one set of main set. Since the connection of two main sets of 43 and 46 is only by bolts 49, it is very easy to separate them.

Figure 11:
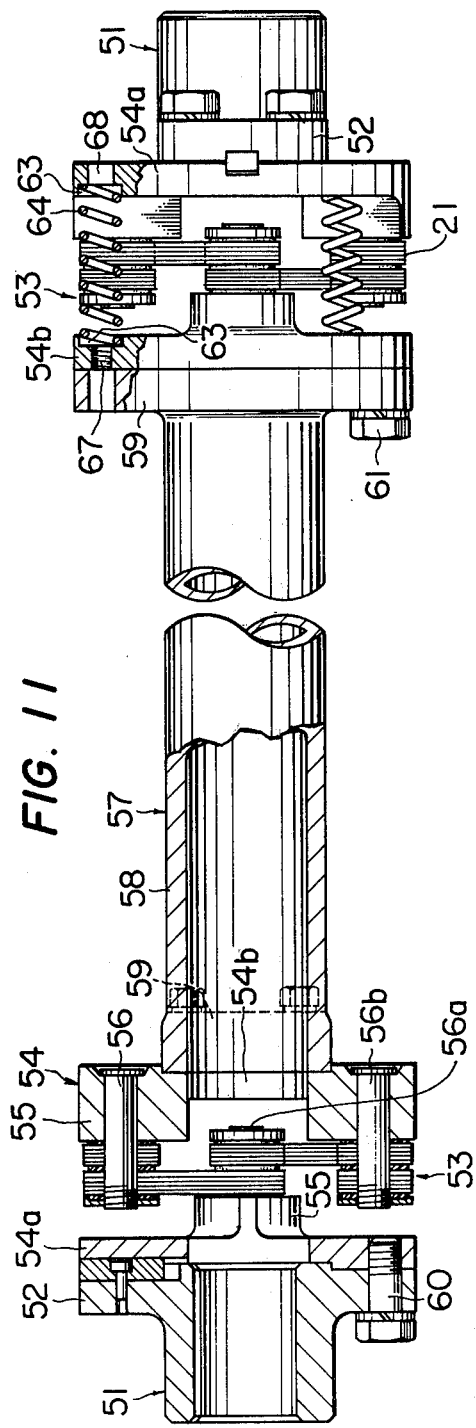
FIG. 11 is an elevation view, partly in section, of one embodiment of the universal coupling having an intermediate shaft according to the present invention.

FIG. 11 shows an embodiment of a universal coupling having an intermediate shaft.

This universal coupling is constructed mainly with hub members 51, main sets 53 and an intermediate shaft 57.

The hub member 51 has a flange 52 for the attachment of the main set 53, and is to be connected with the drive shaft or the driven shaft.

The main set 53 has nearly the same construction as the main set of the flexible coupling described in the first embodiment, that is, a pair of disks 54 have respectively two projections 55, each projection having a pin 56 fixed thereon, a pair of such disks 54 being connected to each other by the connection of the pin 56 of the disk 54a on one side with the pin 56b of the disk 54b on the other side.

The intermediate shaft 57 has a hollow cylindrical body 58 having at both ends a flange 59 for the attachment thereto of the main set 53.

In the universal coupling of the above-described construction, the flange 52 of the hub member 51 is positioned facing one disk 54a of the disks 54 of the main set 53; these items are connected by bolts 60. The flange 59 of the intermediate shaft 57 is positioned facing the other disk 54b of the disks 54 of the main set 53; these items are connected by bolts 61. Thus, the intermediate shaft 57 has the hub members 51 connected respectively to both ends thereof through the respective main sets 53, the overall construction consistuting a universal coupling.

The universal coupling functions in the same manner as the flexible coupling or universal coupling of the above-described construction. By removing the bolts 61 the intermediate shaft 57 can be removed from between the main set 53, the mounting or removal of hub members can be carried out without the shifting of the drive shaft or the driven shaft, thereby making it easier to carry out installation or removal of the shafts and the inspection and maintenance of the driving system.

Where torque is transmitted by a flexible coupling or a universal coupling, an impact force may act on the drive shaft or the driven shaft in the axial direction. In this case, the connecting elements 22 of the connecting member 21 receive a bending moment perpendicular to their surface, causing the connecting member 21 to bend elastically. Thus, the intermediate shaft 57 vibrates with a great amplitude in the axial direction, producing an excessive bending stress on the connecting members 21 which may cause breakage thereof.

Thus, in the embodiment shown in FIG. 11, there is provided a device to absorb such vibration. On the face of each disk 54 from which the pins 56 project, there are provided seats 63 for coil springs made in the form of recesses between adjacent pins 56 at an angle of 45° from the adjacent pins 56 in the circumferential direction and radially outwardly of the connecting members so that springs thereon will not contact the connecting members 21. A pair of the disks 54 are positioned to face each other, and are connected to each other by connecting members 21; then, four coil springs 64 are prestressed and positioned between the disks with the ends in the seats for the coil springs. Each coil spring 64 acts on the disks 54 respectively with the springs being balanced mutually and without being inclined to the disks.

Even if the coupling receives an impact force produced by the drive shaft or the driven shaft in the axial direction, if it is equipped with such coil springs 64, it is not affected by such force, because the impulsive energy of the force is absorbed by the elastic deformation of the springs. The coil springs 64 recover equilibrium in a short time, so that the intermediate shaft 57 can be kept in a state which is nearly still. Thus there can be prevented breakage of the connecting member 21 due to sudden bending and a great amount impact force in the axial direction.

As described above, the intermediate shaft 57 can be dismantled from the main set 53 by removing bolts 61, but in case such shock absorbing coil springs 64 as described above are inserted between the disks 54, one disk 54 is pressed against the flange 59 of the intermediate shaft 57 by the elastic force of the coil springs making it sometimes difficult to dismantle the intermediate shaft 57 from the main set 53. Particularly, if a projection 65 and mating recess 66 are provided respectively on the surface of the disk 54 and in the intermediate shaft 57 (see FIG. 12), so as to connect these elements, the removal of the intermediate shaft 57 will become difficult, because it must be done from the side of the hub member 51 toward which the intermediate shaft 57 must previously be pulled with sufficient strength to overcome the resilient force of the connecting members 21 and the coil springs 64.

In order to avoid the abovementioned difficulty, the universal coupling of FIG. 11 has a tap hole 67 and a clearance hole 68 provided respectively in the seat 63 for the coil spring in the disk 54b and the seat 63 for coil spring in the disk 54a.

Figure 12:
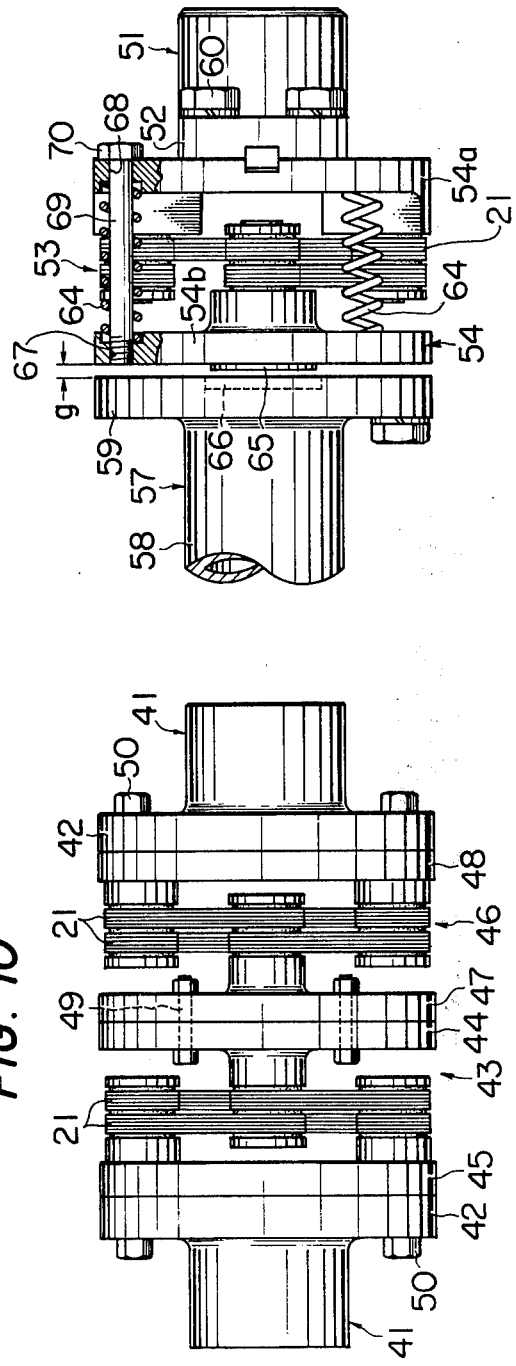
FIG. 12 is an explanatory view for illustrating the assembly and disassembly of the universal coupling of FIG. 11.

For dismantling the intermediate shaft 57, as shown in FIG. 12, a bolt 69 of an appropriate length is inserted through the clearance hole 68 into the coil spring 64, and the tip of the bolt 69 is screwed into the tap hole 67 in the disk 54b. The head portion 70 of the bolt 69 is in contact with the surface of the disk 54b, and therefore, the rotation of the bolt 69 causes the disk 54b to the pulled toward the hub member 51 with sufficient strength to overcome the resilient force of the connecting members 21 and the coil springs 64. There can thus be provided a gap 3 for prevention of the contact between the projection 65 of the disk 54b and the recess 66 in the flange 59 of the intermediate shaft 57. The of pulling force to overcome the resilient force of the connecting members 21 and the coil springs 64 need not be great, because a screw mechanism is used for this purpose, as described above. Also, when mounting the intermediate shaft 57, the disk 54b is previously pulled toward the hub member 21, and the intermediate shaft 57 is placed between the main sets 53, and, then, the bolts 69 are loosened, so that the disk 54b and the flange 59 of the intermediate shaft 57 are abutted.

In the case of the above-described construction, the tap hole in the one disk 54a and the hole 68 of the disk 54a make is possible to pull the disk 54a toward the intermediate shaft 57.

Figure 13:
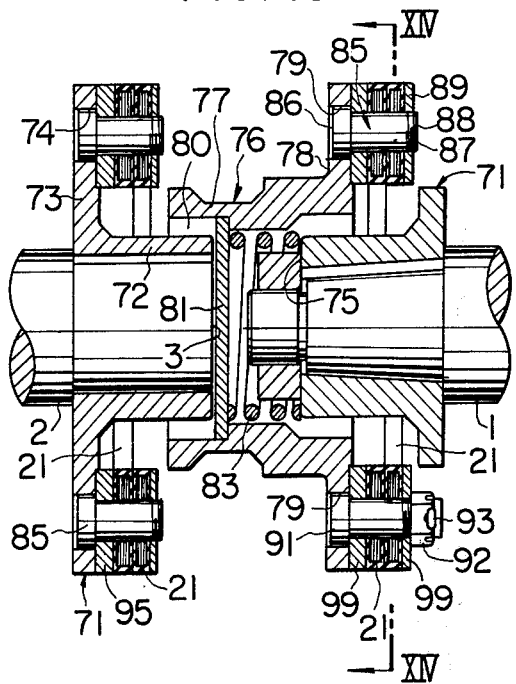
FIG. 13 is a cross-sectional view of another embodiment of the universal coupling having an intermediate shaft according to the present invention.
Figure 14:
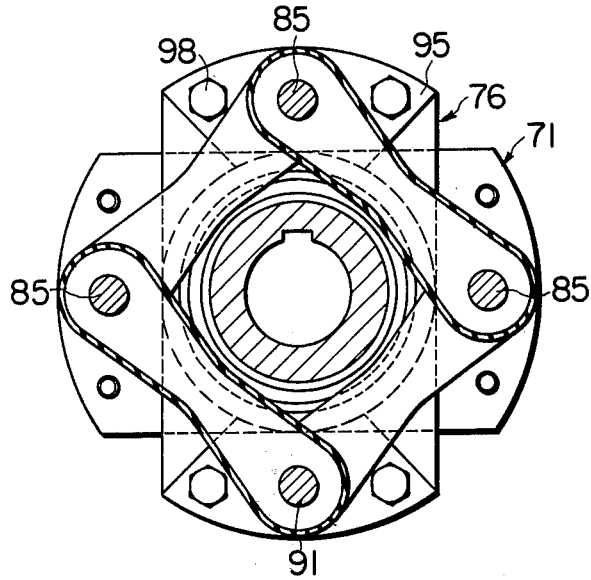
FIG. 14 is a transverse sectional view of the universal coupling shown in FIG. 13 taken on line XIV—XIV thereof.
Figure 15:
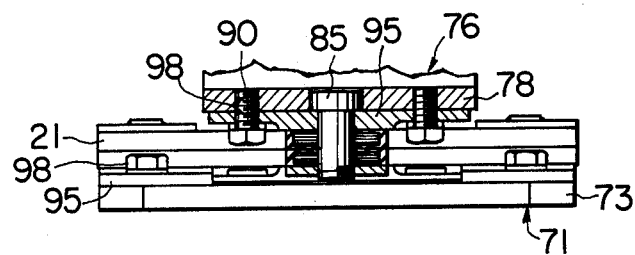
FIG. 15 is a partial sectional view of part of the universal coupling shown in FIG. 13.

FIG. 13 – 15 show another embodiment of the universal coupling having an intermediate shaft, where connecting members are so devised as to be inserted and removed easily.

This universal coupling is composed mainly of a pair of hub members 71, an intermediate shaft 76 and connecting members 21.

Each hub member 71 has a flange 73 provided at one end portion of a hollow, cylindrical body 72, and one is mounted on the drive shaft 1 and the other on the driven shaft 2.

The flange 73 on each hub member is provided with pin holes 74 circumferentially spaced a distance equal to an angle of 180°, and has both side portions partly cut away for better convenience is assembling and dismantling the coupling.

The intermediate shaft 76 is provided with a flange 78 on each end of body 77 with both side portions partly cut away. Each flange 78 is provided with pin holes 79 circumferentially spaced at a distance equal to an angle of 180°. Inside the body 77 there is a shaft contacting plate 81 contacting the end surface 3 of the driven shaft 2. and dividing the hollow interior 80 into two sections.

The cylindrical bodies 72 of the hub members 71 extend partly into the hollow interior 80 of the intermediate shaft 76 from opposite directions. A coil spring 83 for impact absorption is provided between the end surface 75 of the cylindrical body 72 of the hub member 71 on the drive shaft 1 and the shaft contacting plate 81. The coil spring 83, in the same manner as the coil springs 64 of the universal coupling of FIG. 11, absorbs the energy of an impact force in the axial direction, to prevent the vibration of the intermediate shaft 76 in the axial direction for the protection of the connecting members 21 from impact thereof.

In the same manner as in all the above-described embodiments, the hub members 71 and the intermediate shaft 76 are connected by the connecting members 21. The pins for retaining the connecting members 21 are mounted in the flanges 73 of the hub members 71 and the flanges 78 of the intermediate shaft 76 with a special device in this embodiment for better convenience in assembling and dismantling the coupling. Each of the groups of pins 85 and 91 respectively for each pair of an opposed flange 73 of the hub members 71 and flange 78 of the intermediate shaft 76, has four pins distributed in the circumferential direction with the angles between adjacent pins 90°; three pins of such four pins have one end provided with a larger diametered end portion 86, for engagement respectively around the pin holes 74 of the flange 73 and the pin holes 79 of the flange 78. On the other hand, four connecting members 21 constitute one set thereof. Each of the three pins has a pin holder 95 around it with the smaller-diametered portion 87 of the pin engaged in a hole 96 in the central portion of the pin holder 95, and two of the connecting members 21 placed one over the other have the pin extending through the holes therein, and threads 88 near the end of the pin have a nut 89 threaded thereon, so that the pin holder 95 and the connecting members 21 are held tightly between the larger diametered end portion 86 and the nut 89. A washer 27 may be provided as shown in FIG. 6 between the pin holder 95 and the connecting member 21, between the connecting members 21 themselves and between the connecting members 21 and the nut 89. In this way, the four connecting members 21 are connected to each other by means of the pins into a linkage which has one connection left unconnected, The above-described assembly 94 made of four connecting members 21 with one connection left unconnected, is used for the connection of the hub member 71 with the intermediate shaft 76 in the following manner;

The hub member 71 and the intermediate shaft 76 are so arranged that the respective pin holes 74 and 79 are circumferentially spaced at an angle of 90°, and then, the assembly 94 of the connecting members 21 is mounted thereon.

The larger diametered ends of the three pins are inserted into the corresponding pin holes 74 and 77; bolts 98 are inserted through the respective bolt holes 97 which are provided near the respective ends of the pin holders 95, and then are screwed into the respective tap holes 90 provided respectively in the flange 73 of the hub member and the flange 78 of the intermediate shaft 76. Thus, the assembly 94 of the connecting members 21 is fixed on the flanges 73 and 78 respectively at three points; and the two connecting members 21 each having an unconnected end, have their ends connected to each other by a pin 91, and are fixed on the flange 73 or the flange 78. In other words, the pin holder 95 and the connecting members are assembled, and are placed on the coupling with the hole for the fourth pin at the position of the pin hole 74 or 79 of the flange 78 of the intermediate shaft 78 at which the connecting members 21 have not been connected, and then a pin 91 is inserted through the pin hole 74 or 79, the hole 96 of the pin holder 95 and the through holes 23 of the as yet unconnected connecting members. Then, the pin holder 95 is fixed on the flange 73 of the hub member 71 or the flange 78 of the intermediate shaft 76 by the bolt 98; and the pin 91 has spring washer 99 positioned thereon, which is tightened by a grooved nut 92. After being tightened the grooved nut 92, is prevented from being loosened by a split pin 93. Thus, the hub member 71 and the intermediate shaft 76 are connected by means of the connecting members 21.

Figure 16:
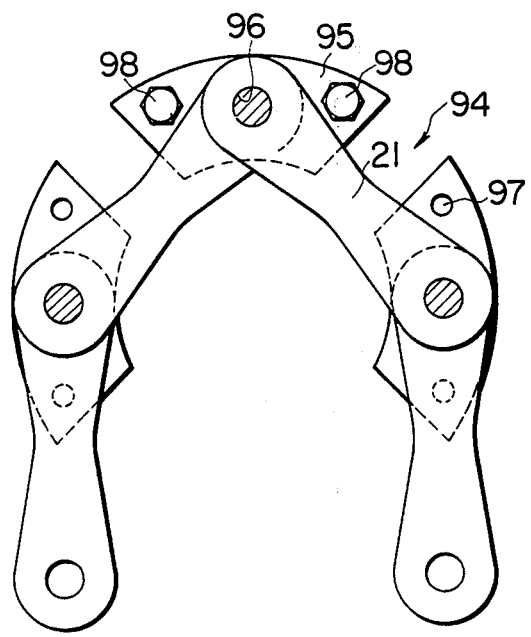
FIG. 16 is an explanator view of a group of connecting members for the universal coupling shown in FIG. 13, from which connecting member a removable pin has been removed.

The dismantling of the connecting members 21 from the universal coupling for the separation of the drive shaft 1 and the drive shaft 2 or for the replacement of connecting members 21, is as follows:

At first, the grooved nut 92 is removed, and so as to release the pin 91 from the flange 78, the pin holder 95 the connecting members 21 and others. At this point the assembly 94 of the four connecting members 21 is in the state as shown in FIG. 16, where there is one connection open. Then the bolts 98 are taken out of the respective pin holders 95, and as the connecting members 21 are somewhat bent in the axial direction of the coupling, the assembly 94 is shifted in the axial direction of the pins 85 or 91 until the larger diametered ends 86 of the pins 85 can be taken out of the pin holes 74 or 79; then the pins 85 are removed in the radial direction of the flange 73 or 78.

In the assembly or dismantling of the connecting members 21, the flange 73 of the hub member 71 and the flange 78 of the intermediate shaft 76, which are partly cut away at both ends, do not hinder the insertion or removal of the bolts 98 into or from the pin holder 95 on the opposite flange.

As made clear from the above explanation of the assembly and dismantling of the connecting members, the universal coupling of this embodiment does not require the shifting of the hub member 71 or the intermediate shaft 76 for assembling or dismantling the connecting members 21. Therefore, such work can be done without shifting of the drive shaft, the driven shaft, a motor, a reduction gear or the like, which are left at their positions.

Also, in the universal coupling of this embodiment, nearly half of the body 72 of the hub member 71 is inserted in the hollow section 80 of the intermediate shaft 76, thereby making it possible to cut very short the distance between the facing surfaces of the universal coupling. Because of the abovementioned advantages, that is, the ease in the assembling and dismantling of the connecting members 21 and the short distance between the facing surfaces, the universal coupling of this embodiment is particularly effective for use in a limited space.

What is claimed is:

1. A flexible coupling for rotating shafts, which comprises a pair of hub members each having a flange and being for connection, respectively, with a drive shaft and a driven shaft, and a main set removably mounted between the flanges of the respective hub members facing each other, said main set having a pair of disks and a plurality of connecting members, each connecting member being composed of a plurality of connecting laminations of resilient thin sheet material and each having an ovaloidal shape having curves connecting a narrowed central portion with semi-circular end portions and each end portion having an opening therein for a pin to go through, each disk having a plurality of pin holes therein perpendicular to said disk and on a common pitch circle, a pin tightly mounted in each pin hole perpendicular to the surface of the disk and welded to said disk, each two adjacent pins being equally spaced in the circumferential direction, the disks of each pair facing each other with the pins therein projecting toward the opposite disk and the pins of the respective disks alternating with each other at equal distances, said connecting members connecting adjacent pins for forming a polygonal linkage along the surface of the disks in the circumferential direction thereof.

2. The flexible coupling as claimed in claim 1 wherein the connecting member has the surface thereof covered with an elastomer, and has a lubricant held between the contacting surfaces of any two connecting elements.

3. A flexible coupling as claimed in claim 1 further comprising a nut threaded on the end of each pin for holding said connecting members on said pin, and an elastomer washer in at least one of the spaces between the disk and a connecting member, between connecting members, and between the connecting member and the nut.

4. A flexible coupling for rotating shafts, which comprises a pair of hub members each having a flange and being for connection, respectively, with a drive shaft and a driven shaft, and a main set removably mounted between the flanges of the respective hub members facing each other, said main set having a pair of disks and a plurality of connecting members, each connecting member being composed of a plurality of connecting laminations of resilient thin sheet material and each having an ovaloidal shape having curves connecting a narrowed central portion with semi-circular end portions and each end portion having an opening therein for a pin to go through, each disk having a plurality of pairs of pin holes therein perpendicular to said disk and on a common pitch circle, a pair of pins tightly mounted in each pair of pin holes perpendicular to the surface of the disk and welded to said disk, each two pairs of adjacent pins being equally spaced in the circumferential direction, the disks of each pair facing each other with the pairs of pins therein projecting toward the opposite disk and the pairs of pins of the respective disks alternating with each other at equal distances, said connecting members connecting adjacent pins of adjacent pairs of pins for forming a polygonal linkage along the surface of the disks in the circumferential direction thereof.

5. A universal coupling for rotating shafts, which comprises a pair of hub members each having a flange and being for connection, respectively, with a drive shaft and a driven shaft, and two main sets removably mounted between the flanges of the respective hub members facing each other, each main set having a pair of disks and a plurality of connecting members, each connecting member being composed of a plurality of connecting laminations of resilient thin sheet material and each having an ovaloidal shape having curves connecting a narrowed central portion with semi-circular end portions and each end portion having an opening therein for a pin to go through, each disk having a plurality of pin holes therein perpendicular to said disk and on a common pitch circle, a pin tightly mounted in each pin hole perpendicular to the surface of the disk and welded to said disk, each two adjacent pins being equally spaced in the circumferential direction, the disks of each pair facing each other with the pins therein projecting toward the opposite disk and the pins of the respective disks alternating with each other at equal distances, said connecting members connecting adjacent pins for forming a polygonal linkage along the surface of the disks in the circumferential direction thereof, said main sets being removably connected to each other with the disks thereof opposite of the disks the main sets attached to said flanges being connected back to back.

6. A universal coupling for rotating shafts, which comprises a pair of hub members each having a flange and being for connection, respectively, with a drive shaft and a driven shaft, an intermediate shaft having a flange at each end, and a main set removably mounted between the flange of one hub member and a flange on one end of the intermediate shaft and a main set removably mounted between the flange of the other hub member and the flange on the other end of said intermediate shaft, each main set having a pair of disks and a plurality of connecting members, each connecting member being composed of a plurality of connecting laminations of resilient thin sheet material and each having an ovaloidal shape having curves connecting a narrowed central portion with semi-circular end portions and each end portion having an opening therein for a pin to go through, each disk having a plurality of pin holes therein perpendicular to said disk and on a common pitch circle, a pin tightly mounted in each pin hole perpendiculr to the surface of the disk and welded to said disk, each two adjacent pins being equally spaced in the circumferential direction, the disks of each pair facing each other with the pins therein projecting toward the opposite disk and the pins of the respective disks alternating with each other at equal distances, said connecting members connecting adjacent pins for forming a polygonal linkage along the surface of the disks in the circumferential direction thereof.

7. The universal coupling as claimed in claim 5, wherein the main sets further comprises coil springs extending between the disks for absorbing impact forces in the axial direction of said shafts.

8. A universal coupling for rotating shafts, which comprises a pair of hub members each having a flange at one end and being for connection, respectively, with a drive shaft and a driven shaft, a hollow intermediate shaft having a flange at each end, a plurality of connecting members each being composed of connecting laminations of a resilient thin sheet material, the respective ends of the intermediate shaft having the other ends of the respective hub members extending thereinto, said flanges having pin openings therein, pins on the respective flanges inserted in the respective openings, the flanges on the hub members being in spaced opposed relationship with said flanges on said hollow intermediate shaft with the pins on one opposed flange alternating at equal intervals with the pins on the other opposed flange, said connecting members connecting each two adjacent pins in a polygonal linkage extending along the surfaces of the flanges in the circumferential direction thereof, and pin holders freely detachably mounted on the flanges at positions corresponding to the pin locations and each having a pin receiving hole therein, the pins each having a larger diameter portion fitted in the pin openings in the flanges and having a smaller diameter portion tightly fitted in the pin receiving hole in the pin holders, and securing means securing each pin, connecting member and pin holder together.

9. The universal coupling as claimed in claim 8 wherein the intermediate shaft has a transverse shaft contacting plate within the shaft in a position dividing the hollow interior into two portions, said shaft contacting plate being contacted by the end of one of the hub members, and a coil spring between shaft contacting plate and the end of the other hub member for absorbing axial impact forces on the shafts.

* * * * *